United States Patent
Handschy

(10) Patent No.: US 8,144,269 B2
(45) Date of Patent: Mar. 27, 2012

(54) REFLECTIVE LCOS DISPLAYS UTILIZING NOVEL POLARIZING BEAM SPLITTERS

(75) Inventor: Mark A. Handschy, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 192 days.

(21) Appl. No.: 12/684,730

(22) Filed: Jan. 8, 2010

(65) Prior Publication Data

US 2010/0171909 A1 Jul. 8, 2010

Related U.S. Application Data

(60) Provisional application No. 61/143,409, filed on Jan. 8, 2009.

(51) Int. Cl.
*G02F 1/1335* (2006.01)

(52) U.S. Cl. .................. 349/5; 349/6; 349/9; 349/96

(58) Field of Classification Search ................ 349/6, 8, 349/96
See application file for complete search history.

(56) References Cited

U.S. PATENT DOCUMENTS

| | | | |
|---|---|---|---|
| 4,367,924 | A | 1/1983 | Clark et al. |
| 5,182,665 | A | 1/1993 | O'Callaghan et al. |
| 5,552,916 | A | 9/1996 | O'Callaghan et al. |
| 5,748,164 | A | 5/1998 | Handschy et al. |
| 5,808,800 | A | 9/1998 | Handschy et al. |
| 2008/0278675 | A1 | 11/2008 | Escuti et al. |
| 2009/0009668 | A1* | 1/2009 | Tan et al. ................ 349/1 |

OTHER PUBLICATIONS

Doany, F. E., Singh, R. N., Rosenbluth, A. E., Chid, G. L.-T., Projection Display Throughput: Efficiency of Optical Transmission and Light-Source Collection, Imb J. Res. Develop. vol. 42, No. 3/4 May/Jul. 1998, pp. 387-399.

Komanduri, Ravi K., Oh, Chulwoo, Escuti, Michael J., Kekas, D. Jason, Polarization Independent Liquid Crystal Microdisplays, 18:3: Late-News Paper, SID 08 Digest, pp. 236-239.

Oh, Chulwoo and Escuti, Michael J., Achromatic Diffraction from Polarization Gratings with High Efficiency, Optic Letters, vol. 33, No. 20, Oct. 15, 2008, pp. 2287-2289.

Oh, Chulwoo, Komanduri, Ravi K., Brandon L. Conover, Escuti, Michael J., Polarization-Independent Modulation Using Standard Liquid Crystal Microdisplays and Polymer Polarization Gratings, 16.2, IDRC 08, 2008 SID, pp. 298-301.

Kekas, D. Jason, HoloBright Technology for LC Projection Displays, Imagine Optix, Feb. 2009, Control No. D20209Z1012, pp. 1-24.

* cited by examiner

*Primary Examiner* — Phu Vu
(74) *Attorney, Agent, or Firm* — Robert G. Crouch; Marsh Fischmann & Breyfogle LLP

(57) ABSTRACT

Disclosed are display systems using reflective liquid-crystal microdisplays that efficiently use unpolarized light sources without needing to double the étendue of the source as occurs with conventional polarization conversion systems. Furthermore, the display systems can utilize on-axis projection lenses, and fast-switching ferroelectric-liquid-crystal-on-silicon (FLCOS) microdisplays. The systems utilize beam splitters that split unpolarized incident light into two diverged beams of opposite polarization. Ferroelectric liquid crystal display elements are combined with fixed retarders to enable an element that can selectively flip or not flip the handedness of incident circularly polarized light.

14 Claims, 9 Drawing Sheets

FIG. 4
(PRIOR ART)

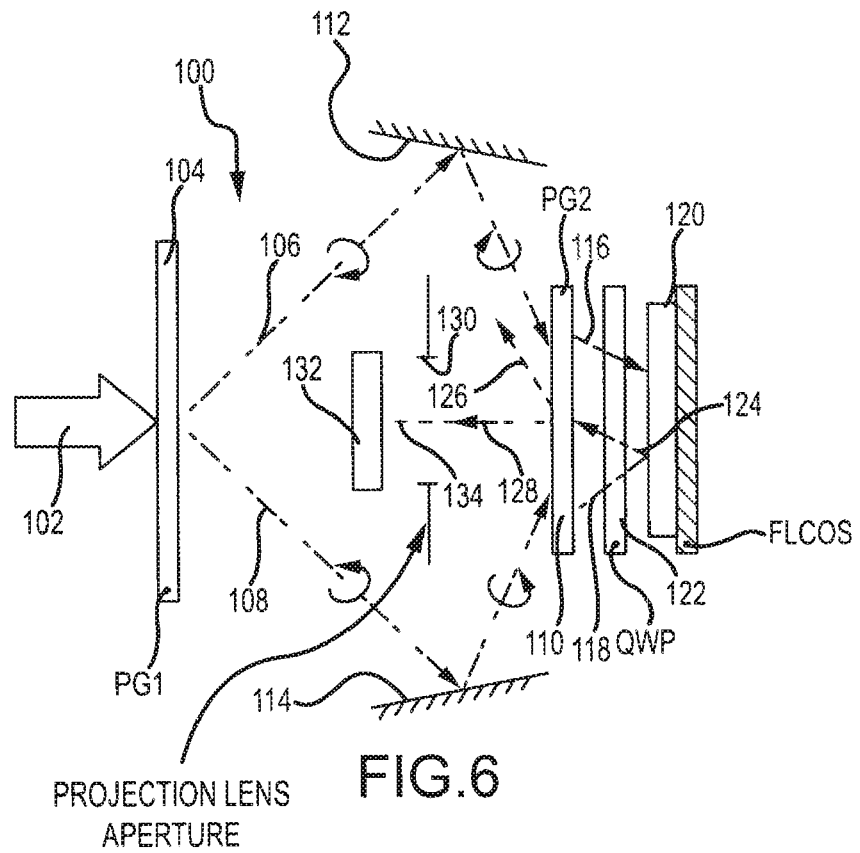
FIG. 6
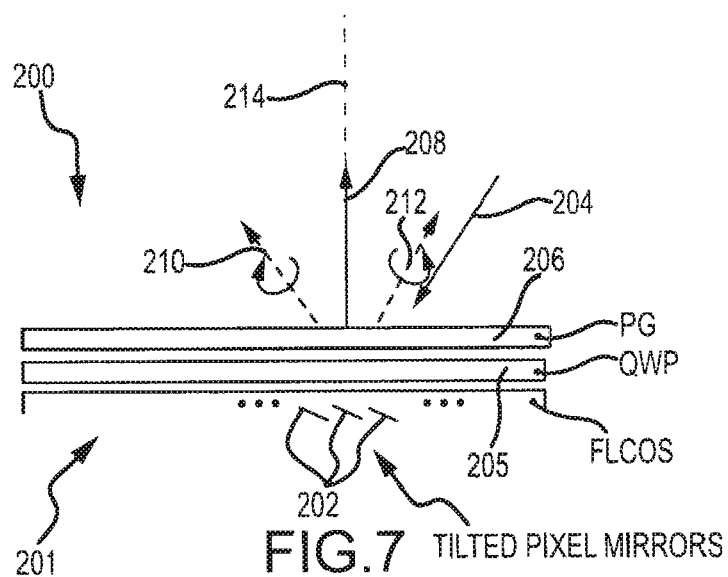
FIG. 7 TILTED PIXEL MIRRORS

REFLECTIVE LCOS DISPLAYS UTILIZING NOVEL POLARIZING BEAM SPLITTERS

CROSS-REFERENCE TO RELATED APPLICATION

This application claims priority under 35 U.S.C. 119 to U.S. Provisional Application No. 61/143,409, entitled "Reflective LCOS Displays Utilizing Novel Polarizing Beam Splitters," filed on Jan. 8, 2009, the contents of which are incorporated herein as if set forth in full.

BACKGROUND

The combination of solid-state light sources like light-emitting diodes (LEDs) and lasers, with microdisplays like liquid-crystal-on-silicon (LCOS) devices is leading to the development of electronic projectors small enough to be embedded in, for example, the handset of a mobile phone. In such "pico projectors," small optical engine size and high optical efficiency are especially important. Achieving size and efficiency goals requires new ways of managing polarized light to illuminate and image microdisplay panels. It would increase the efficiency of such optical systems if they could efficiently use unpolarized light to illuminate a display that ordinarily requires polarized light, particularly if this could be accomplished without doubling the étendue of the light source.

It is against this background that the teachings disclosed herein have been developed.

BRIEF DESCRIPTION OF THE DRAWINGS

FIG. 4 shows reflective and transmissive display configurations with switchable polarization-grating displays.

FIG. 6 shows a split-path on-axis reflective projection display configuration.

FIG. 7 shows a blazed mirror projection system.

DETAILED DESCRIPTION

Figure 1:
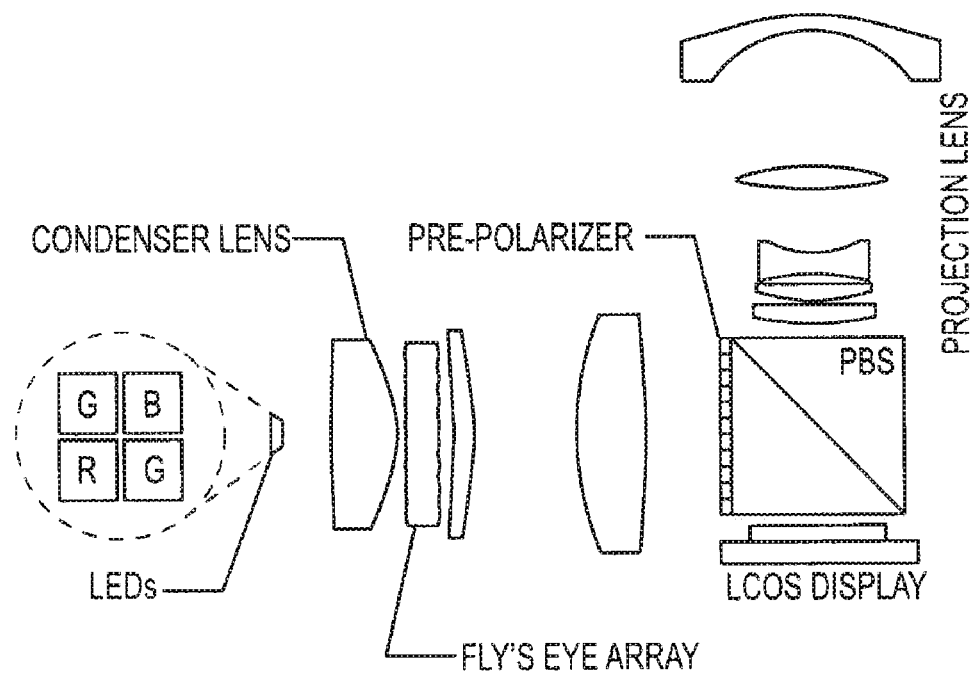
FIG. 1 shows a first embodiment of a pico projector.

While the embodiments of the present invention are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims.

FIG. 1 illustrates by example an overall optical architecture with the system elements often found in a pico projector. Four LED die, one red, one blue, and two green, are mounted on a single substrate. A condenser lens collects the light they emit, collimates it, and directs it towards a fly's eye double microlens array. After passing the fly's eye array, a pair of lenses (a positive meniscus and a biconvex lens, in this example) further shapes the light beam, and passes it towards a pre-polarizer. The now-polarized beam enters a polarizing beam splitter (PBS), the hypotenuse face of which reflects the beam onto an LCOS microdisplay. After the pixels of the microdisplay modulate the beam with electronic image information (provided to the microdisplay in the form of image data, as is well known) the beam of light reflected by the ON pixels of the microdisplay is transmitted through the PBS, and formed into an image on a projection screen (not shown) by the projection lens. The drawing of FIG. 1 is not necessarily to scale, and is only intended to indicate the various elements composing an exemplary pico projector optical system.

The system of FIG. 1 suffers a significant efficiency loss due to unpolarized light emitted by the LEDs being only partly transmitted by the pre-polarizer at the entrance to the PBS. It is known in the art that so-called "polarization conversion systems" (PCS) can be used to overcome efficiency losses that would otherwise arise from the use of unpolarized light sources in systems requiring polarized illumination. Several such PCS implementations are described by F. E. Doany et al. in their article "Projection display throughput: efficiency of optical transmission and light-source collection," published in the IBM Journal of Research and Development, vol. 42, pp. 387-399 (1998). However, all such polarization conversion systems double the étendue or "extent" of the light source, necessitating faster, larger, and more complex implementations of other optical system elements such as of the PBS and projection lens.

Although liquid-crystal (LC) displays usually require polarized light, LC displays based on diffraction are known that can use unpolarized light. For example, as disclosed in U.S. Pat. Nos. 5,182,665 and 5,552,916, a modulator for unpolarized light can be made from a switchable diffraction grating formed in a ferroelectric liquid crystal (FLC), such as an FLC where the optic axis can be switched through approximately 90°. Such an unpolarized-light FLC modulator may have a thickness giving it half-wave retardance if operated in transmission, or quarter-wave retardance if operated in reflection. Alternately, it has been disclosed by Komanduri et al., for example in their paper "Polarization Independent Liquid Crystal Microdisplays," published in the 2008 *SID International Symposium Digest of Technical Papers*, Jay Morreale, editor (Society for Information Display, San Jose, Calif., 2008), pp. 236-239 that switchable diffraction gratings that operate on unpolarized incident light can also be made from nematic liquid crystals. It is further disclosed by Escuti et al. in U.S. patent application Ser. No. 11/816,916, and in the paper "Achromatic diffraction from polarization gratings," published in Optics Letters, vol. 33, pp. 2287-2289 (2008), that a similar arrangement can be used to make fixed (i.e. not necessarily switchable) gratings that can function as an achromatic polarizing beam splitter film.

Figure 2A:
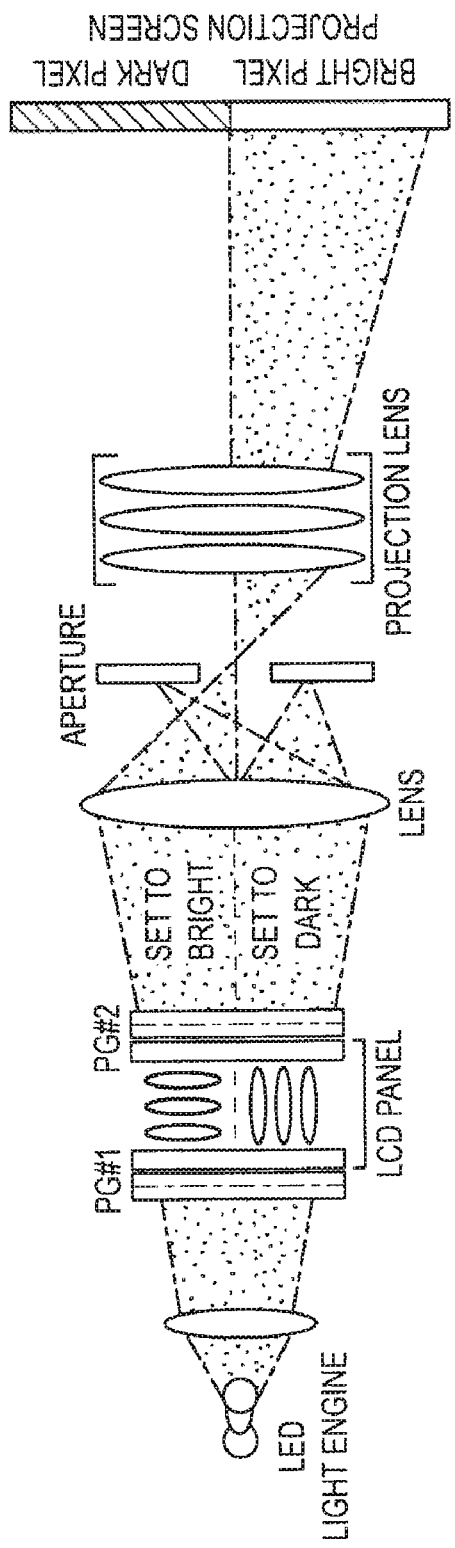
FIGS. 2(a), 2(b), and 2(c) show a transmissive LCD operating with unpolarized illumination.
Figure 2B:
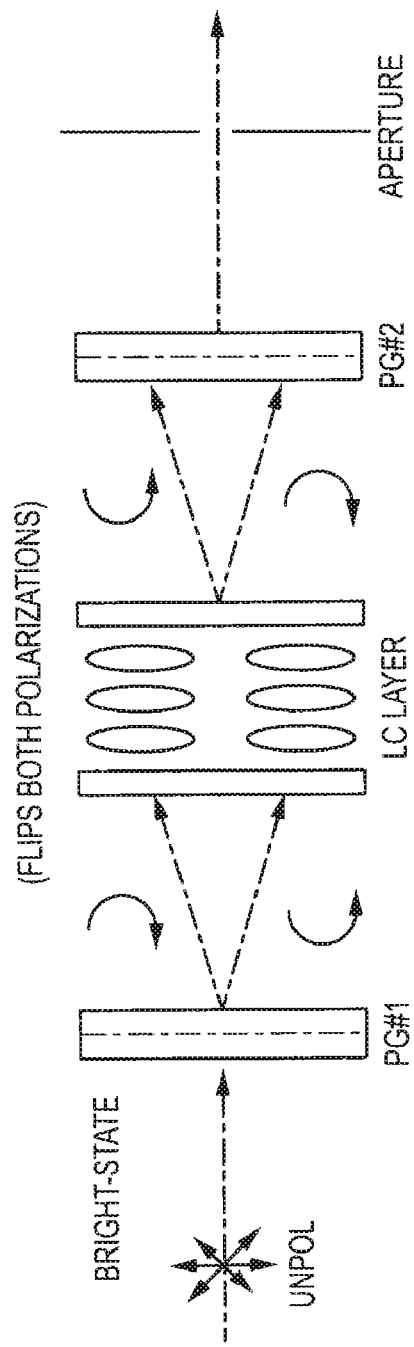
Figure 2C:
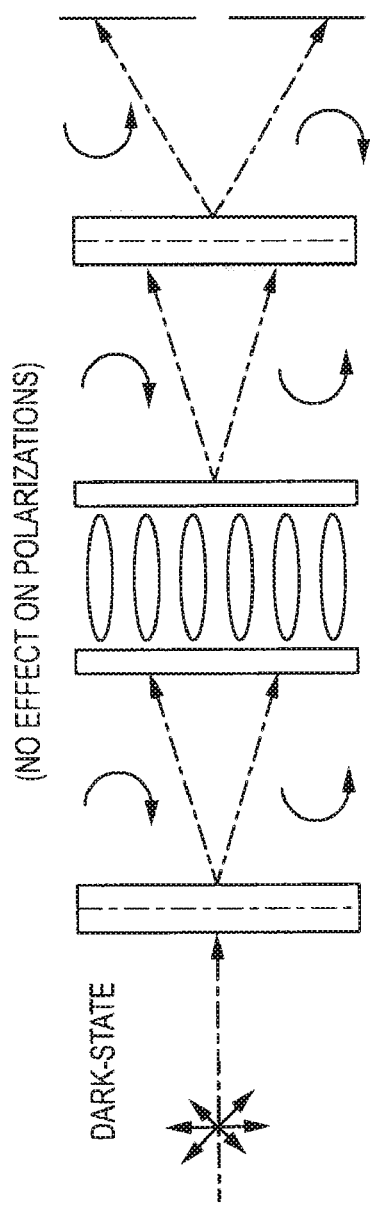

A pair of such polarization grating films can be used in conjunction with a more-or-less conventional transmissive liquid-crystal display (LCD) to make a display that efficiently operates with unpolarized illumination, as disclosed by Oh et al. in the paper "Polarization-Independent Modulation Using Standard Liquid Crystal Microdisplays and Polymer Polarization Gratings," published in 2008 *International Display Research Conference Proceedings* (Society for Information Display, San Jose, Calif., 2008) pp. 298-301, and shown here as FIG. 2. A first polarization-grating film diffracts an unpolarized beam of incident light into two diverged beams of opposite circular polarization. As shown in FIG. 2, the LCD operates to selectively either reverse the handedness of both orthogonal circular polarizations of light (the "bright" state in FIG. 2(b)) or to reverse neither (the "dark" state in FIG. 2(c)). A second polarization-grating film acts to either recombine the diverged beams coming from a bright-state pixel or to further diverge the beams coming from a dark-state pixel. An aperture, optionally combined with a lens system (not shown) can act to pass the recombined beam while rejecting the further-diverged beam.

Looking in closer detail at FIGS. 2(b) and 2(c), it can be seen that a polarization grating (such as PG#1 in FIGS. 2(b) and 2(c)) will re-direct an on-axis beam of unpolarized light into two divergent beams of approximately equal intensity that each are circularly polarized, but with opposite handedness. One of the interesting characteristics of polarization gratings is that a substantial majority of the transmitted light intensity is contained in these beams. There may also be a significantly lower intensity beam that remains on axis, but this effect is expected to be reduced as polarization gratings continue to be improved and developed. Comparing PG#2 in FIG. 2(b) to PG#2 in FIG. 2(c), it can be seen that circularly-polarized light of one handedness that enters PG#2 from off the axis normal to the surface of the polarization grating will be re-directed further off-axis and the handedness will be flipped (FIG. 2(c)), while light of the opposite handedness that enters PG#2 from the same direction off the axis normal to the surface of the polarization grating will be re-directed closer to or on-axis and the handedness will be flipped (FIG. 2(b)). It can therefore be understood that, as shown in FIG. 2(b), this property can be used to recombine the two divergent beams of circularly polarized light into a single on-axis beam of unpolarized light. Conversely, as shown in FIG. 2(c), this property can be used to further diverge the two divergent beams of circularly polarized light, so that the divergent beams can be blocked by a light stop.

Displays based on ferroelectric liquid crystals, such as disclosed in U.S. Pat. No. 4,367,924, operate by a selective in-plane rotation of the FLC optic axis. With incident light linearly polarized along the FLC optic-axis orientation in a first state, the display passes the light without change. If in a second state, the FLC display's optic axis orientation is about 45° from the first, and the display thickness gives it about half-wave retardance, the display's action on the same incident linearly polarized light will be approximately to rotate the polarization by 90°. Thus, between crossed conventional polarizers, such an FLC display can provide ON and OFF states with differing transmitted intensities. However, such an FLC display cannot simply be placed between the polarization-grating films of FIG. 2 to make a display that operates on unpolarized light. Regardless of the in-plane orientation of its optic axis, it flips the handedness of incident circularly polarized light, with the only change depending on orientation being the phase of the transmitted light.

Figure 3:
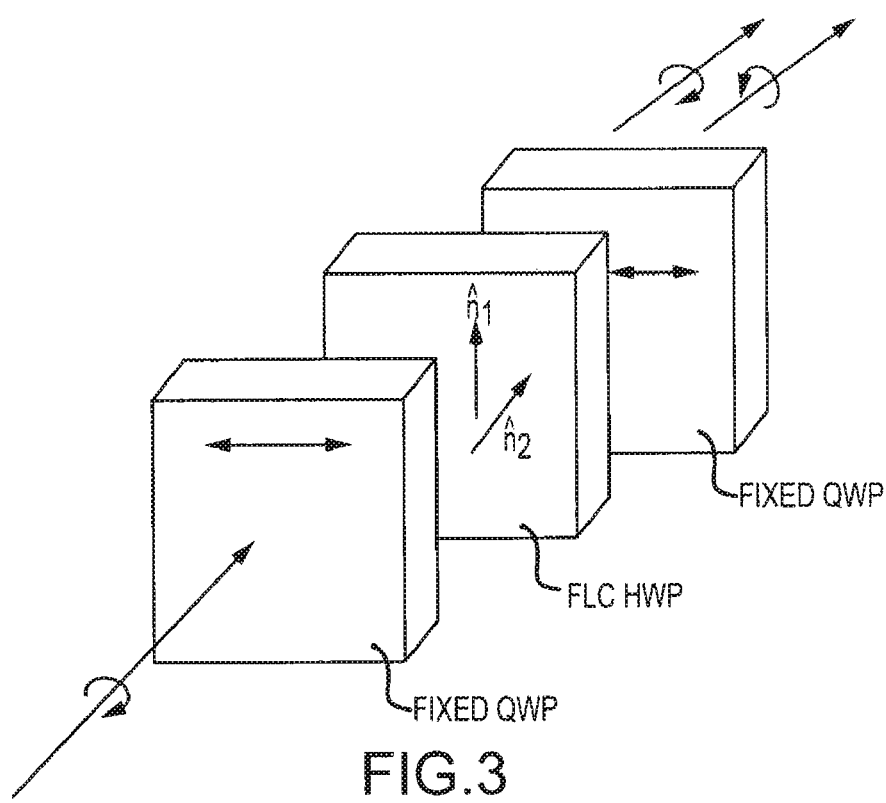
FIG. 3 shows a transmissive FLC element with fixed wave plates.

To make an FLC-based display that utilizes polarization-grating films like those described with reference to FIG. 2, a conventional FLC display can be combined with fixed wave plates, as shown schematically in FIG. 3. To make a transmissive display, the switchable FLC element may have half-wave retardance, as before. In a first embodiment, the FLC switchable element would be sandwiched between two auxiliary fixed wave plates, each having half the retardance of the FLC element (e.g., quarter wave plates), but with their optic axes parallel to each other (horizontal in the drawing) and perpendicular to the optic axis of the FLC element in a first state (denoted as $\hat{n}_1$ in the drawing). In this state, the combination of the FLC element and the auxiliary retarders or wave plates makes a compound zero-wave plate. The polarization state of light transmitted through such a combination is not substantially changed. In a second state the optic axis of the FLC element (denoted $\hat{n}_2$ the drawing) makes an angle of about 45° to the axes of the auxiliary retarders. Incident circularly polarized light is converted to linearly polarized light upon transmission through one of the fixed retarders. The polarization of this linearly polarized light is unchanged upon transmission through the FLC element; transmission through the second of the fixed retarders converts this light back to circular, but with the opposite handedness as the incident light. Thus, this compound element could functionally replace the element labeled "LC Layer" in a display with the construction discussed with reference to FIG. 2. Although the configuration described in this paragraph utilizes a combination of the FLC element and waveplates that makes a compound zero-waveplate, it would also be possible to alternatively have the optic axes of the waveplates be parallel to (instead of perpendicular to) the FLC element, making a one-waveplate, at least for a given wavelength. For applications where only a single wavelength of light is used, this may be an acceptable alternative.

Figure 4:
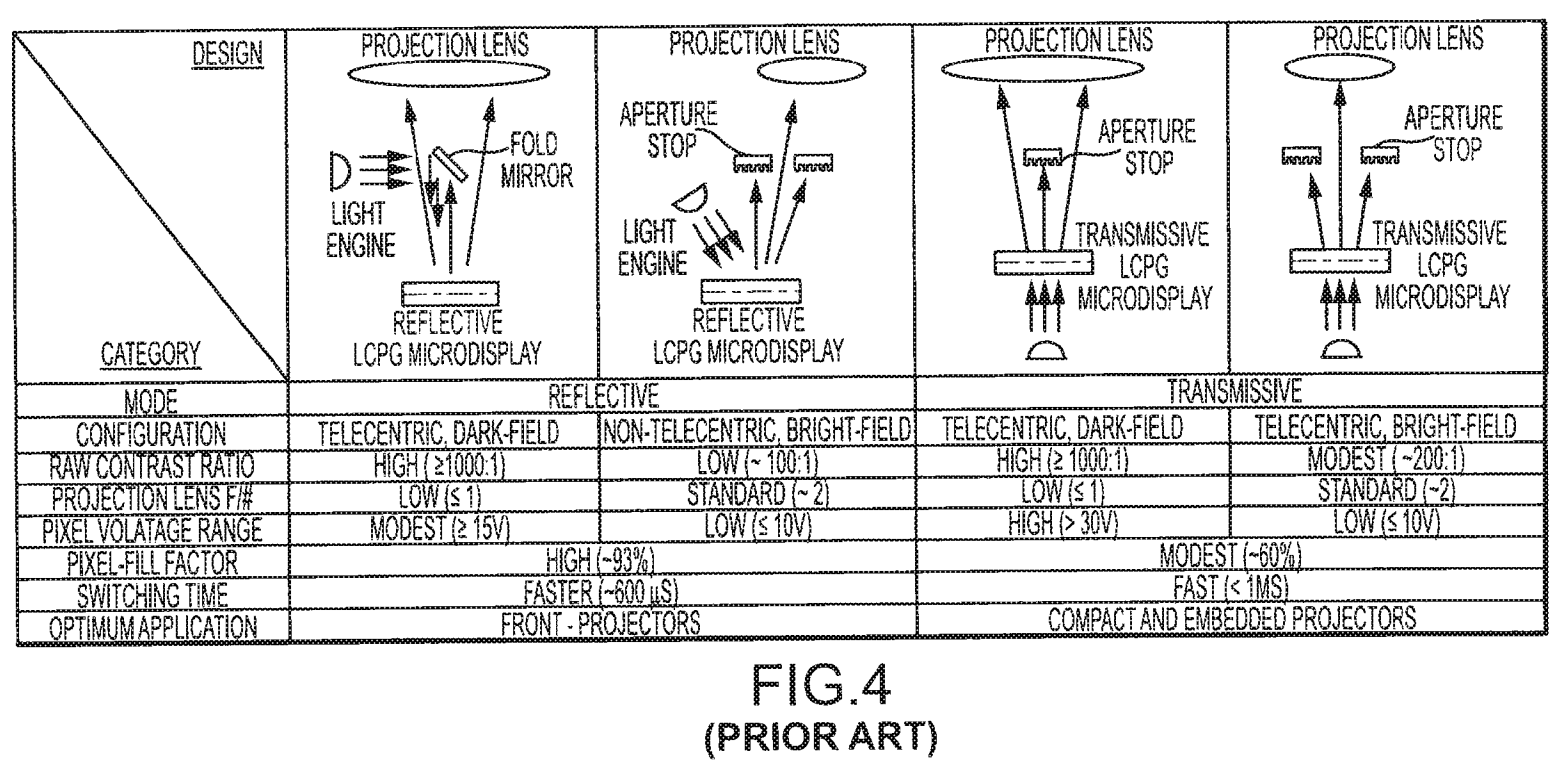

As disclosed by Komanduri, devices with switchable polarization gratings can also be used in reflection as well as in transmission, as shown here in FIG. 4. As an alternative to a switchable polarization-grating element, a fixed polarization grating element can be combined with a switchable reflective handedness-flipping element, in a manner similar to that described above with regard to transmissive displays, to make a functional equivalent. However, conventional reflective FLC devices, such as disclosed in U.S. Pat. Nos. 5,748,164 and 5,808,800 can not serve alone as elements to selectively flip or not flip the handedness of circularly polarized light.

Figure 5:
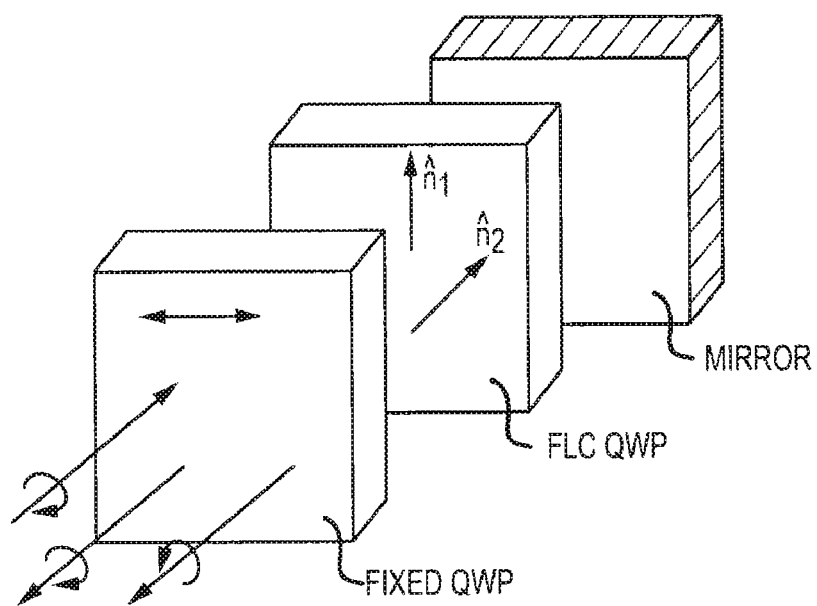
FIG. 5 shows a reflective FLC element with fixed wave plates.

However, a switchable reflective FLC element can be combined with a single fixed retarder to make a switchable light-handedness-flipper, using the configuration shown schematically in FIG. 5. Now, the switchable FLC element would have quarter-wave retardance. The FLC switchable element would be sandwiched between an auxiliary fixed wave plate, having retardance equal to that of the FLC element, and a mirror. The optic axis of the fixed wave plate would be oriented perpendicular to optic axis of the FLC element in a first state (denoted as $\hat{n}_1$ in the drawing). In this state, the combination of the FLC element and the auxiliary retarder or wave plate again makes a compound zero-wave plate. The polarization state of circularly-polarized light reflected by such a combination is flipped, just as it would be by a bare mirror. In a second state, the optic axis of the FLC element (denoted $\hat{n}_2$ in the drawing) makes an angle of about 45° to the axis of the auxiliary retarder. Incident circularly polarized light is converted to linearly polarized light upon transmission through the fixed retarder. The polarization of this linearly polarized light is unchanged upon passing twice through the FLC element; transmission a second time through the fixed retarder converts this light back to circular, but now with the same handedness as the incident light. Thus, this compound element could functionally replace the elements labeled "Reflective LCPG Microdisplay" in displays with the configurations shown in FIG. 4.

The projection systems using reflective microdisplays shown in FIG. 4, whether using a reflective LCPG microdisplay or a fixed diffraction grating combined with a reflective switchable handedness-flipper, suffer, however, from one of two shortcomings. In the "dark field" configuration shown in the second column of the figure, the light used to create the projected image is diffracted around the fold mirror. In one embodiment of such a system, the illumination optics (not shown) would act in conjunction with the reflective display panel to create, from the un-deviated light coming from the OFF-state pixels, an image of the light source that matched the size of the stop created by the fold mirror. Then, the light coming from the ON pixels would create two spots, each the same size as the spot from the OFF pixels, but just outside of and on either side of the fold-mirror stop. Thus, the projection lens aperture would require a diameter three times that needed if it only had to accept the un-deviated light beam. In the "bright field" configuration shown in the third column of the figure, on the other hand, while the projection lens aperture need only be large enough for a single illumination-source "spot," it is required to be displaced from the axis normal to the surface of the display panel, which significantly complicates its design.

Figure 8:
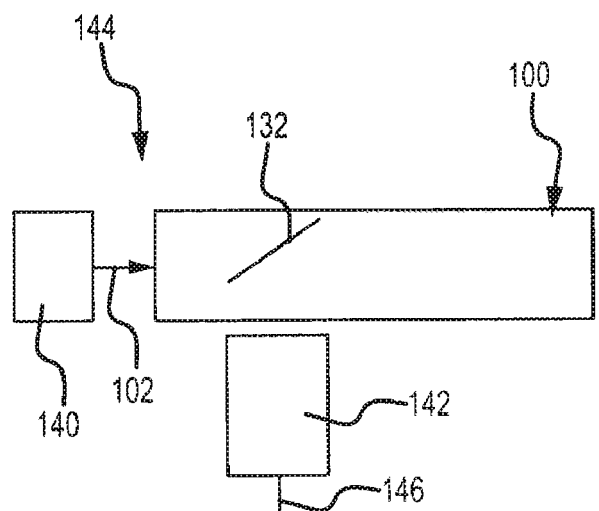
FIG. 8 is a block diagram of a light engine of a pico projector using the projection system shown in FIG. 6.

The configuration 100 shown schematically in FIG. 6 provides a projection system with neither of these shortcomings. Light 102 from an unpolarized source (not shown) is incident on a first polarization grating 104 that splits it into two circularly-polarized beams 106 and 108 of opposite handedness. These diverging beams 106 and 108 are then caused to converge on a second polarization grating 110. One example of polarization gratings that could be used in the configuration 100 (and in the configuration 200 shown in FIG. 7) is a HoloBright™ polarization grating produced by Imagine Optix of Raleigh, N.C. In the illustrated embodiment, the convergence is effected by a pair of mirrors 112 and 114, but many other ways to do this are known in the optical arts. When mirrors are used, they may be designed to avoid producing phase shifts that could degrade the circular polarizations of the two beams 106 and 108. The beams 106 and 108 may be caused to converge at a greater angle than the angle of divergence produced by 104. The second polarization grating 110 is chosen so that each incoming illumination beam 106 and 108 is diffracted into beams 116 and 118, respectively, that strikes the reflective display element at a smaller angle of incidence than if 110 were absent; for example, at half the angle. The reflective display element could be a ferroelectric-liquid-crystal-on-silicon (FLCOS) microdisplay 120 coupled with a fixed wave plate such as a quarter-wave plate 122, as described above with reference to FIG. 5. The quarter-wave plate 122 converts circularly-polarized light to linearly-polarized light on the first pass through and, after being reflected and modulated by the microdisplay 120, converts linearly-polarized light to circularly-polarized light. A first pixel state (the OFF or dark state) of the reflective display element then reflects these incident beams 116 and 118 with a polarization state such that upon their second pass through the second polarization grating 110 their propagation angle compared to the axis 134 normal to the plane of the array of reflective pixels of the microdisplay 120 is increased (one of the reflected beams 124 is shown and the divergence of that beam is shown with the beam 126 as a dashed line). A second pixel state (the ON or bright state) of the reflective display element reflects the incident beams 116 and 118 into beams with the opposite polarization state as the incident beams, such that upon their second pass through the second polarization grating 110 their propagation angle compared to the axis normal to the plane of the array of reflective pixels is decreased. This is shown in FIG. 6 by showing the reflected beam 124 in this case being re-directed by the second polarization grating 110 into an on-axis beam 128. These beams (such as beam 128) then pass through the aperture of an aperture stop 130 associated with the projection lens (not shown), and hence contribute to a viewed image. In this way, the projection lens can operate on-axis to the reflective display, and with an aperture diameter just large enough to pass a single image of the light source. The projection lens could have a fold 132 so that light passing through the aperture is reflected out normal to the plane of the drawing, and thereby not strike 104 or the light source. As is shown in FIG. 8, the configuration 100 can be combined with a light source 140 and appropriate projection optics 142 that produces a beam 146 (for creating a projected image) to provide the entire light engine 144 of a pico projector utilizing the teachings herein. It should be understood that while the aperture stop 130 is illustrated in configuration 100 as being located sequentially before the fold 132 and thus before the projection optics 142 in light engine 144, the aperture stop could also be located at other locations, just as the projection optics 142 could be located entirely or partially before the fold 132.

Figure 9:
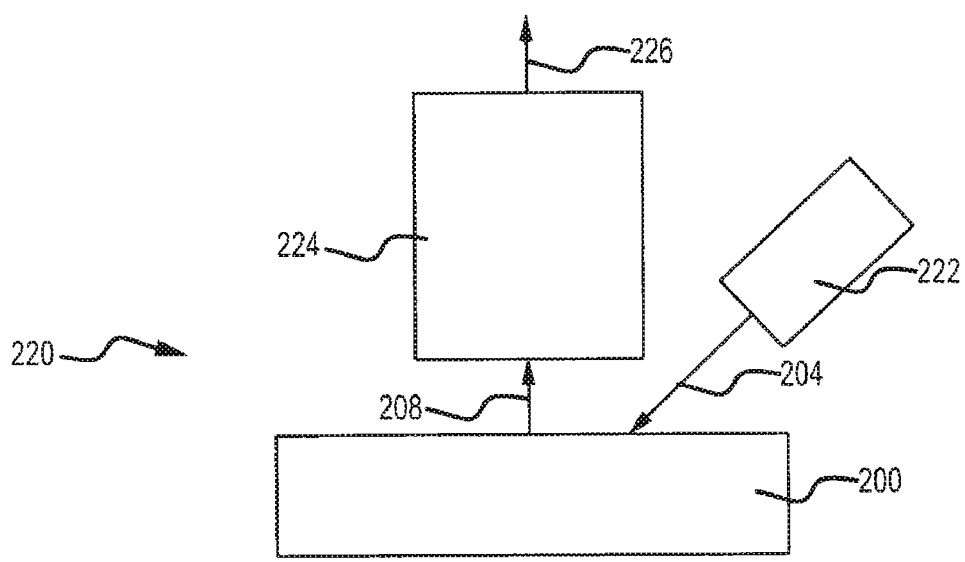
FIG. 9 is a block diagram of a light engine of a pico projector using the projection system shown in FIG. 7.

An alternative system 200 that again overcomes both of the shortcomings mentioned previously is described with reference to FIG. 7. Here, rather than having the mirrored, reflective pixel electrodes (which define the pixels of the FLCOS display 201) lie parallel to the plane of the pixel array, the mirrors 202 are somewhat inclined or tilted relative to that plane. Then, unpolarized illumination 204, schematically indicated in the drawing by the solid arrow pointing towards the FLCOS display 201, is directed at the display from off axis. The system also includes a quarter-wave plate 205 and a polarization grating 206. By appropriate choice of the illumination incidence angle, the pitch of the polarization grating 206, and the pixel-mirror blaze angle (the amount of tilt of each pixel mirror 202), the system 200 can be configured so that for a first pixel state (the ON or bright state), all the unpolarized incident light 204 is reflected and directed in a beam 208 parallel to the axis 214 normal to the surface of the pixel array of the display 201, the polarization grating 206, and the quarter-wave plate 205, and for a second pixel state (the OFF or dark state) the unpolarized incident light is reflected and directed into two diverging beams (shown as dashed lines 210 and 212 in the figure). This enables the illumination optics and projection lens to be configured so that all the ON-state light passes through the projection lens aperture while the OFF-state light is not so collected. Further, this system 200 provides the benefit of having the projection optics located on-axis. In FIG. 9, the system 200 is shown as part of a projector light engine 220 that includes a light source 222 and projection optics 224, to form a beam 226 for creating a projected image.

The systems described with reference to FIG. 6 and to FIG. 7 efficiently use all the light from an unpolarized light source without the doubling of system étendue that accompanies conventional polarization conversion systems, and without needing the projection lens to operate off-axis to the display. More specifically, the systems include an apparatus for displaying an image in accordance with an input image, where the apparatus includes: a reflective liquid-crystal microdisplay that accepts image data; a source of illumination light having a predetermined optical extent; and a projection lens having an aperture. The projection lens is on-axis to the reflective liquid-crystal microdisplay and wherein the projection lens aperture is less than twice the aperture needed to pass all the light from the source of illumination, and wherein the fraction of light passed by the projection lens aperture does not substantially depend on the polarization state of the illumination light.

As can be appreciated, disclosed herein are display systems using reflective liquid-crystal microdisplays that efficiently use unpolarized light sources without needing to double the étendue of the source as occurs with conventional polarization conversion systems. Furthermore, the display systems can utilize on-axis projection lenses, and fast-switching ferroelectric-liquid-crystal-on-silicon (FLCOS) microdisplays. The systems utilize beam splitters that split unpolarized incident light into two diverged beams of opposite polarization. Ferroelectric liquid crystal display elements are combined with fixed retarders to enable an element that can selectively flip or not flip the handedness of incident circularly polarized light.

While the embodiments disclosed herein utilize displays with ferroelectric liquid crystals, the displays could alternatively utilize nematic liquid crystals. If nematic liquid crystals were used, then instead of using quarter-wave plates, a different and appropriate amount of fixed retardation could be used (e.g., a one-eighth-wave plate) or no retardation or wave plate could be used.

While the embodiments of the invention have been illustrated and described in detail in the drawings and foregoing description, such illustration and description is to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

What is claimed:

1. An apparatus for displaying an image in accordance with an input image, the apparatus comprising:
    a first polarization grating;
    a second polarization grating aligned with and spaced apart from the first polarization grating;
    a light stop located between the first and second polarization gratings;
    a wave plate aligned with and located on an opposite side of the second polarization grating from the first polarization grating;
    a reflective liquid crystal microdisplay that accepts image data, the microdisplay being aligned with and located on an opposite side of the wave plate from the first and second polarization gratings; and
    a fold mirror that receives light reflected by the microdisplay and passing through the wave plate, the second polarization grating, and the light stop, the mirror reflecting the received light in a direction so that the reflected light does not pass through the first polarization grating.

2. An apparatus as defined in claim 1, wherein the first polarization grating receives unpolarized input light that is divided by the grating into two divergent beams of opposite-handed circularly-polarized light, and wherein these divergent beams pass on opposite sides of the light stop where they are reflected by one of a pair of reflective surfaces toward the second polarization grating.

3. An apparatus as defined in claim 2, wherein the light reflected from the pair of reflective surfaces toward the second polarization grating is received by the second polarization grating and directed toward the wave plate and microdisplay at an angle closer to an axis normal to the surface of the microdisplay than the angle of the light reflected from the pair of reflective surfaces.

4. An apparatus as defined in claim 2, wherein the wave plate is a quarter-wave plate that converts the beams of circularly-polarized light into beams of linearly-polarized light.

5. An apparatus as defined in claim 4, wherein the microdisplay modulates the light it reflects by selectively either flipping or not flipping the polarization direction of each of the beams of linearly-polarized light.

6. An apparatus as defined in claim 5, wherein the quarter-wave plate receives the beams of linearly-polarized light from the microdisplay and converts it to beams of circularly-polarized light.

7. An apparatus as defined in claim 6, wherein the second polarization grating receives the beams of circularly-polarized light from the quarter-wave plate and, depending on the handedness of the circular polarization, either re-directs the beams to an angle further from or closer to the axis normal to the surface of the microdisplay, wherein the light directed closer to the axis normal to the surface of the microdisplay passes through the light stop and the light directed further from the axis normal to the surface of the microdisplay is blocked by the light stop.

8. An apparatus as defined in claim 1, wherein the microdisplay includes ferroelectric liquid crystals.

9. An apparatus as defined in claim 8, wherein the wave plate is a quarter-wave plate.

10. An apparatus for displaying an image in accordance with an input image, the apparatus comprising:
    a polarization grating having an axis normal to the surface thereof;
    a wave plate aligned with and located on one side of the polarization grating, the wave plate having an axis normal to the surface thereof that is substantially aligned with the axis normal to the surface of the polarization grating; and
    a reflective liquid crystal microdisplay that accepts image data, the microdisplay being aligned with and located on an opposite side of the wave plate from the polarization grating, the microdisplay having an axis normal to the surface thereof that is substantially aligned with the axis normal to the surface of the polarization grating, wherein the microdisplay includes a plurality of reflective pixel electrodes that each have an axis normal to the surface thereof that is tilted relative to the normal axes of the microdisplay, wave plate, and polarization grating.

11. An apparatus as defined in claim 10, wherein the tilt of the reflective pixel electrodes allows input light to be directed toward the apparatus from a location off the axis normal to the surface of the polarization grating and allows selected light modulated by the microdisplay to be directed away from the apparatus substantially along the axis normal to the surface of the polarization grating.

12. An apparatus as defined in claim 11, wherein the apparatus allows other selected light modulated by the microdisplay to be directed away from the apparatus in a direction significantly away from the axis normal to the surface of the polarization grating.

13. An apparatus as defined in claim 10, wherein the microdisplay includes ferroelectric liquid crystals.

14. An apparatus as defined in claim 13, wherein the wave plate is a quarter-wave plate.

* * * * *